United States Patent

Hajmousa et al.

(10) Patent No.: US 7,587,832 B2
(45) Date of Patent: Sep. 15, 2009

(54) ROTATING LASER TRANSMITTER

(75) Inventors: Ayman Hajmousa, Washington, OH (US); Michael F. Glantz, Kettering, OH (US); James N. Hayes, Urbana, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 17 days.

(21) Appl. No.: 11/852,758

(22) Filed: Sep. 10, 2007

(65) Prior Publication Data

US 2009/0067461 A1   Mar. 12, 2009

(51) Int. Cl.
*G01B 11/26* (2006.01)
*G01C 15/02* (2006.01)

(52) U.S. Cl. .......................................... 33/290; 33/227

(58) Field of Classification Search .................. 33/227, 33/290–291, 281, 283, 285–286, DIG. 21, 33/DIG. 1
See application file for complete search history.

(56) References Cited

U.S. PATENT DOCUMENTS

| | | | | |
|---|---|---|---|---|
| 5,331,395 A | * | 7/1994 | Piske et al. | 33/DIG. 21 |
| 5,852,493 A | * | 12/1998 | Monnin | 33/291 |
| 5,917,587 A | * | 6/1999 | Rando | 356/149 |
| 5,994,688 A | * | 11/1999 | Jackson et al. | 250/206.2 |
| 6,160,616 A | * | 12/2000 | Ohtomo et al. | 356/247 |
| 6,384,420 B1 | * | 5/2002 | Doriguzzi Bozzo | 250/548 |
| 6,688,011 B2 | * | 2/2004 | Gamal et al. | 33/290 |
| 7,352,944 B2 | * | 4/2008 | Yang | 33/286 |
| 2003/0101605 A1 | * | 6/2003 | Tacklind et al. | 33/286 |
| 2003/0229997 A1 | * | 12/2003 | Gamal et al. | 33/290 |

(Continued)

FOREIGN PATENT DOCUMENTS

DE    94 16 888 U1    2/1995

(Continued)

OTHER PUBLICATIONS

Invitation to Pay Additional Fees and Communication Relating to the Results of the Partial International Search pertaining to International application No. PCT/US2008/075105 dated Jan. 28, 2009.

*Primary Examiner*—Yaritza Guadalupe-McCall
(74) *Attorney, Agent, or Firm*—Dinsmore & Shohl LLP

(57) ABSTRACT

The transmitter has a generally flat, circuit board stator, a rotor including a plurality of magnets mounted in a ring around a central opening, and a bearing, supporting the rotor for rotation about an axis that extends through the central opening. A pentaprism assembly including an optics holder is mounted on the rotor for rotation therewith. The pentaprism assembly receives a beam of laser light through the central opening and redirects at least a portion of the laser light outward in a direction normal to the rotation axis. A laser source, mounted on the stator, provides a beam of laser light through the central opening to the pentaprism assembly. The beam of laser light is aligned with the rotation axis. The laser source includes a collimating lens positioned within the rotor. A shield plate of magnetic material beneath the stator exerts a force on the rotor in conjunction with the magnets, taking play out of the bearing. The transmitter uses Hall effect sensors on the stator to control switching current to coils on the stator. The transmitter also uses the outputs of the Hall effect sensors and a timer output to control dithering of the laser beam.

14 Claims, 6 Drawing Sheets

U.S. PATENT DOCUMENTS

| | | |
|---|---|---|
| 2005/0241164 A1 | 11/2005 | Glantz |
| 2005/0278963 A1* | 12/2005 | Treichler et al. .............. 33/227 |
| 2006/0218805 A1* | 10/2006 | Greco ......................... 33/291 |
| 2007/0204474 A1* | 9/2007 | Lin ............................ 33/286 |
| 2008/0110037 A1* | 5/2008 | Hayase et al. ................. 33/290 |

FOREIGN PATENT DOCUMENTS

| | | |
|---|---|---|
| EP | 1 220 421 A2 | 7/2002 |
| EP | 1 376 056 A1 | 1/2004 |
| EP | 1 503 221 A1 | 2/2005 |
| GB | 2 200 474 A | 8/1988 |

* cited by examiner

ROTATING LASER TRANSMITTER

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

The present invention relates to laser transmitters of the type that are useful for surveying or spatial positioning at a construction site or elsewhere. Laser transmitters of the type that project a thin beam of laser light or a fan-shaped beam of laser light, and rotate the beam about a rotation axis, have been in use for a number of years at construction sites. Such transmitters can be used with manual surveying systems and also as a part of automated surveying systems. Laser transmitters of this type can also be used in spatial positioning systems that provide for control of earthmoving machines, and the like, to shape a construction site to a desired contour.

It is common to operate laser transmitters in a "dither" mode in which the laser beam is rapidly swept from side to side, illuminating only a small portion of an entire revolution. This technique permits a greater amount of power to be applied to a small portion of the beam rotation, illuminating a segment of interest with higher average power. Dithering involves reversing the direction of the transmitter motor after it has swept through a small segment of a complete rotation. For a transmitter to be capable of dithering has previously required that the transmitter include an accurate shaft angle encoder or similar device. It will be appreciated, however, that this will increase the cost of the transmitter significantly.

Other limitations have been encountered with prior art laser transmitters. Significantly, prior art transmitters have been limited in some respects with regard to the bearing support for the rotating pentaprism assemblies. A pentaprism has a useful property in that it will reflect outward a beam of light at ninety degrees to the path of the beam entering the pentaprism. Fluctuations in the orientation of the pentaprism will, however, cause the vertical position of the beam to fluctuate. When the beam fluctuates vertically, this in turn, cases the beam to be less than a reliable reference.

In summary, laser transmitters of necessity must be precise in operation. This need for precision, however, has resulted in transmitter constructions that are expensive to manufacture, that are somewhat complicated, and that are not as compact as might be desired. It is seen that there is a need, therefore, for a transmitter construction which overcomes the limitations of prior laser transmitters.

SUMMARY OF THE INVENTION

This need is met by a laser transmitter according to the present invention. The transmitter has a generally flat, circuit board stator, a rotor including a plurality of magnets mounted in a ring around a central opening or a continuous ring magnet, and a bearing, supporting the rotor for rotation about a rotation axis that extends through the central opening, A pentaprism assembly, including an optics holder, is mounted on the rotor for rotation therewith. The pentaprism assembly receives a beam of laser light through the central opening and redirects at least a portion of the laser light outward in a direction normal to the rotation axis. A laser source, mounted on the stator, provides a beam of laser light through the central opening to the pentaprism assembly. The beam of laser light is aligned with the rotation axis. The laser source includes a collimating lens positioned within the rotor.

The pentaprism assembly may include a pentaprism that redirects a portion of the beam of laser light radially outward in a direction normal to the rotation axis, while permitting the remaining portion of the beam of laser light to pass through the pentaprism in the same direction as the rotation axis. The laser source comprises a light emitting diode and a generally cylindrical housing mounted on the circuit board stator. The housing surrounds the light emitting diode and permits the beam from the diode to pass there through. The collimating lens is mounted in the housing such that the collimated beam of laser light is directed to the pentaprism assembly. The bearing has an inner race mounted on the generally cylindrical housing and an outer race secured to the rotor.

The transmitter may include a generally flat, circuit board stator, including a plurality of motor coils. A laser source is mounted on the stator for providing a beam of laser light directed outward from the circuit board stator. A rotor includes a plurality of magnets mounted in a ring around a central opening. Alternatively, a continuous ring magnet with a plurality of poles may be utilized. A pentaprism assembly includes an optics holder mounted on the rotor for rotation therewith. The pentaprism assembly receives the beam of laser light through the central opening and redirects at least a portion of the laser light outward in a direction normal to the rotation axis. A bearing, supporting the rotor for rotation about a rotation axis that extends through the central opening and that is aligned with the beam of laser light, comprises a single ball bearing having a plurality of bearing balls between an outer race, secured to the rotor, and an inner race. A magnetic shield plate is positioned on the side of the circuit board stator opposite the rotor for providing magnetic attraction between the plurality of magnets and the shield plate. By this arrangement, the play in the bearing is substantially eliminated.

The pentaprism assembly may include a pentaprism that redirects a portion of the beam of laser light radially outward in a direction normal to the rotation axis, while permitting the remaining portion of the beam of laser light to pass through the pentaprism in the same direction as the rotation axis. The laser source may comprise a light emitting diode and a generally cylindrical housing mounted on the circuit board stator. The housing surrounds the light emitting diode and permits the beam from the diode to pass there through. The collimating lens may be mounted in the housing such that a collimated beam of laser light is directed to the pentaprism assembly. The bearing has an inner race mounted on the generally cylindrical housing and an outer race secured to the rotor.

The laser transmitter comprises a generally flat, circuit board stator, a rotor including a plurality of magnets mounted in a ring around a central opening, and a bearing, supporting the rotor for rotation about a rotation axis that that is generally perpendicular to the generally flat, circuit board stator, and that is aligned with the center of the central opening. A laser source, mounted on the stator, provides a beam of laser light directed outward from the circuit board stator in alignment with the rotation axis. The laser source includes a light emitting diode mounted on the stator, a collimating lens, and an optics holder extending from the circuit board stator and supporting the collimating lens within the central opening and substantially removed from the circuit board stator. A pentaprism assembly includes an optics holder mounted on the rotor for rotation therewith. The pentaprism assembly receives the beam of laser light through the central opening and redirects at least a portion of the laser light outward in a direction normal to the rotation axis.

The pentaprism assembly includes a pentaprism that redirects a portion of the beam of laser light radially outward in a direction normal to the rotation axis, while permitting the remaining portion of the beam of laser light to pass through the pentaprism in the same direction as the rotation axis. The laser source comprises a light emitting diode and a generally cylindrical housing mounted on the circuit board stator. The housing surrounds the light emitting diode and permits the beam from the diode to pass there through. The collimating lens is mounted in the housing such that a collimated beam of laser light is directed to the pentaprism assembly. The bearing has an inner race mounted on the generally cylindrical housing and an outer race secured to the rotor.

The laser transmitter comprises a stator, a laser source, mounted on the stator, for providing a beam of laser light directed outward from the stator, a rotor including a plurality of magnets mounted in a ring around a central opening or a continuous ring magnet, and a bearing, supporting the rotor for rotation about a rotation axis that extends through the central opening and that is aligned with the beam of laser light, A pentaprism assembly including an optics holder is mounted on the rotor for rotation therewith. The pentaprism assembly receives the beam of laser light through the central opening and redirects at least a portion of the laser light outward in a direction normal to the rotation axis. A magnetic shield plate on the side of the stator opposite the rotor applies a force to the rotor in the direction of the axis of rotation such that the rotor applies an axial force to the bearing. As a result, the magnetic attraction between the plurality of magnets and the magnetic shield plate substantially eliminates any play in the bearing.

The bearing may comprise an inner race supported on the laser source, an outer race engaged by the rotor, and a plurality of balls between the inner race and the outer race. The laser source may include a cylindrical housing on which the inner race is supported. The magnetic shield plate on the side of the stator opposite the rotor may be annular in shape. The bearing may comprise an outer race supported by the inner race and engaging the rotor.

The laser transmitter may comprise a stator, a laser source for providing a beam of laser light, a rotor including a plurality of magnets, and a bearing, supporting the rotor for rotation about a rotation axis. The bearing comprises a single inner race and a single outer race with a plurality of bearing balls therebetween. A pentaprism assembly includes an optics holder mounted on the rotor for rotation therewith. The pentaprism assembly receives the beam of laser light and redirects at least a portion of the laser light outward in a direction normal to the rotation axis. A plate of magnetic material, which may be annular in shape, is positioned to provide an axial biasing force to the bearing whereby magnetic attraction between the plurality of magnets and the plate substantially eliminates the play in the bearing. Alternatively a continuous magnet with a plurality of poles may be used.

The laser transmitter may comprising a stator including a plurality of motor coils and a pair of Hall effect sensors. A rotor, including a plurality of magnets mounted in a ring, is supported for rotation about a rotation axis by a bearing. A laser source provides a beam of laser light. A pentaprism assembly includes an optics holder and is mounted on the rotor for rotation therewith. The pentaprism assembly receives the beam of laser and redirects at least a portion of the beam outward in a direction normal to the rotation axis. A motor drive circuit is responsive to the Hall effect sensors and to a timer, and repeatedly drives the rotor in a first direction and then in a second direction, with the reversal of the direction of rotation being based at least in part on the passage of time after the Hall effect sensor provides an indication of the rotor being in a specific location.

The stator may include two motor coils. The motor drive circuit may drive the rotor in a first direction upon receipt of an output from the Hall effect sensor, and then reverse the direction of rotation after the passage of a predetermined amount of time.

Accordingly, it is an object of the present invention to provide a laser transmitter in which the construction and operation of the transmitter are improved.

DETAILED DESCRIPTION OF THE PREFERRED EMBODIMENTS

Figure 1:
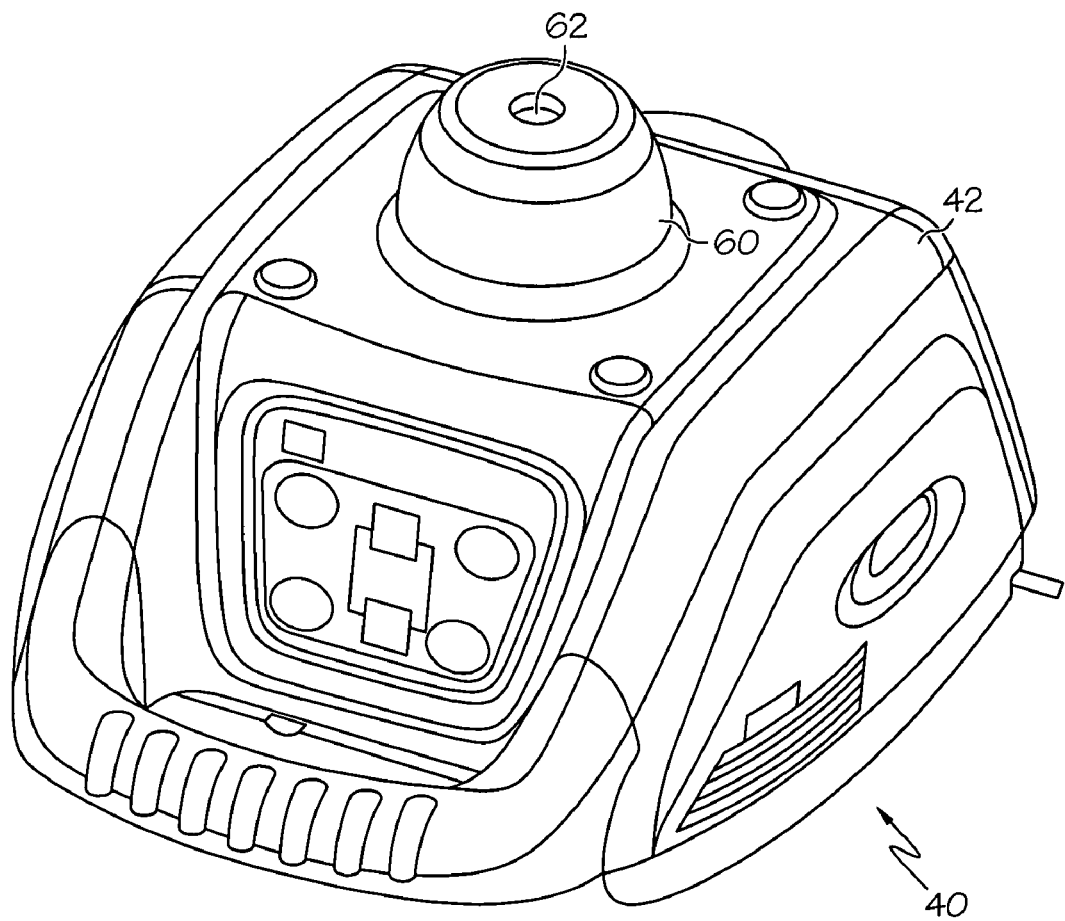
FIG. 1 is a perspective view of a laser transmitter according to the present invention.

Reference is made to FIGS. 1 through 4 which illustrate a laser transmitter 40 constructed according to the present invention. The laser transmitter 40 has a transmitter case 42. The transmitter includes a generally flat, circuit board stator 68, a rotor 70 including a plurality of magnets 66 mounted in a ring around a central opening in rotor 70, a bearing 64, supporting the rotor 70 for rotation about a rotation axis that extends through the central opening, and a pentaprism assembly 50 including an optics holder 71 mounted on the rotor 70 for rotation therewith. If desired, the optics holder 71 may be molded as a unitary upper portion of the rotor 70, as shown. Also, if desired, the plurality of magnets 66 may be a continuous ring magnet laving a plurality of poles arranged therearound. A laser source, including laser diode 52, collimating lens 56 and generally cylindrical housing 59, directs a beam of laser light generally upward in alignment with the axis of rotation of the rotor 70, with respect to the frame of reference illustrated in FIG. 2, to pentaprism 53 of the pentaprism assembly 50. The pentaprism assembly 50 receives the beam of laser light through the central opening in the rotor 70 and redirects at least a portion of the laser light outward through opening 58 in cover 60 in a direction normal to the rotation axis. The path of the laser beam is illustrated by dashed line 61 in FIGS. 3 and 4. It will be noted that the laser diode 52 emits a beam that is then collimated by lens 56 positioned within the rotor 70. Lens 56 is positioned a substantial distance from the circuit board stator 68 and the laser diode 52 to permit the beam to widen to the desired diameter prior to collimation.

Figure 2:
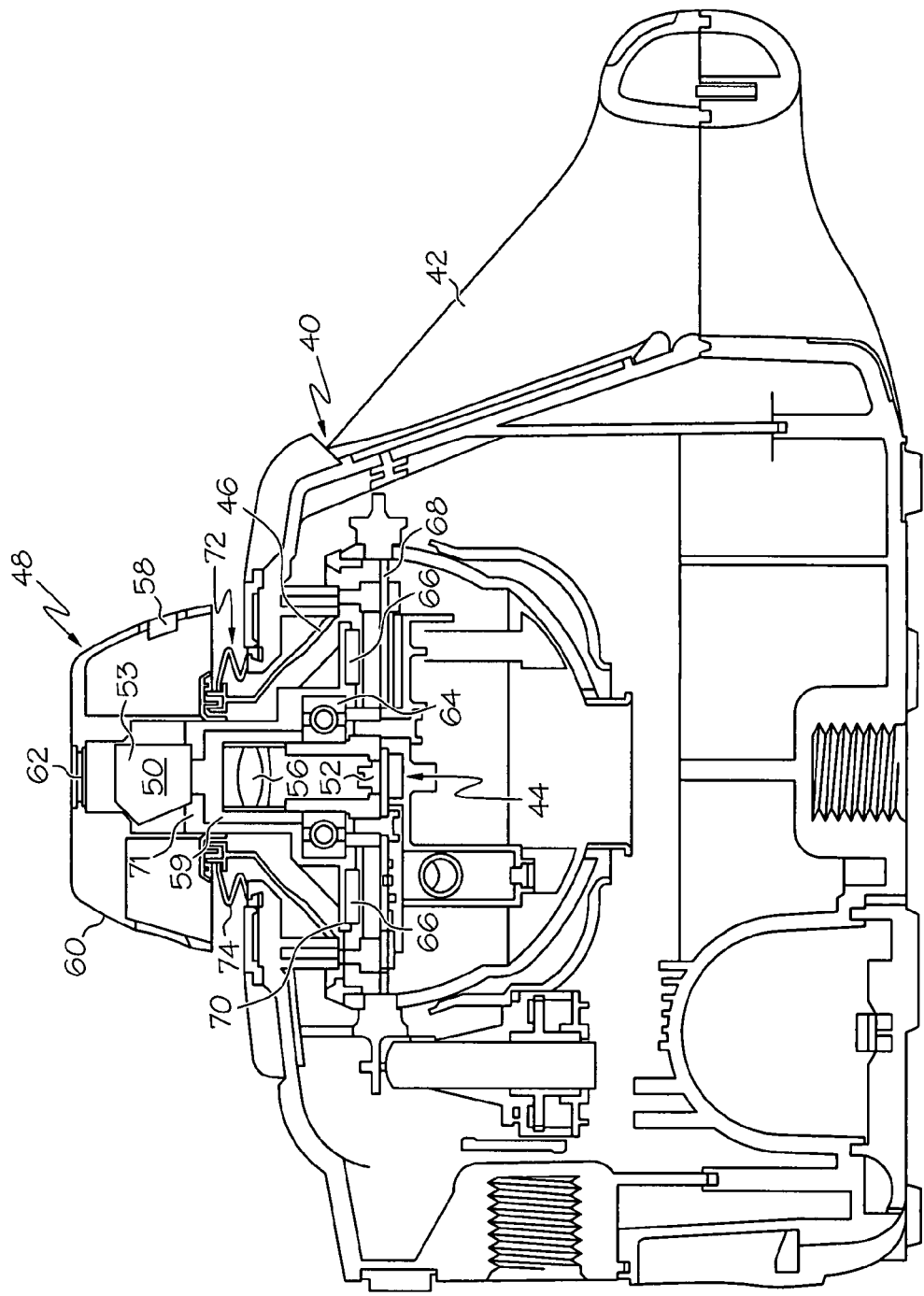
FIG. 2 is a sectional view of the laser transmitter taken through the rotatable laser head.
Figure 3:
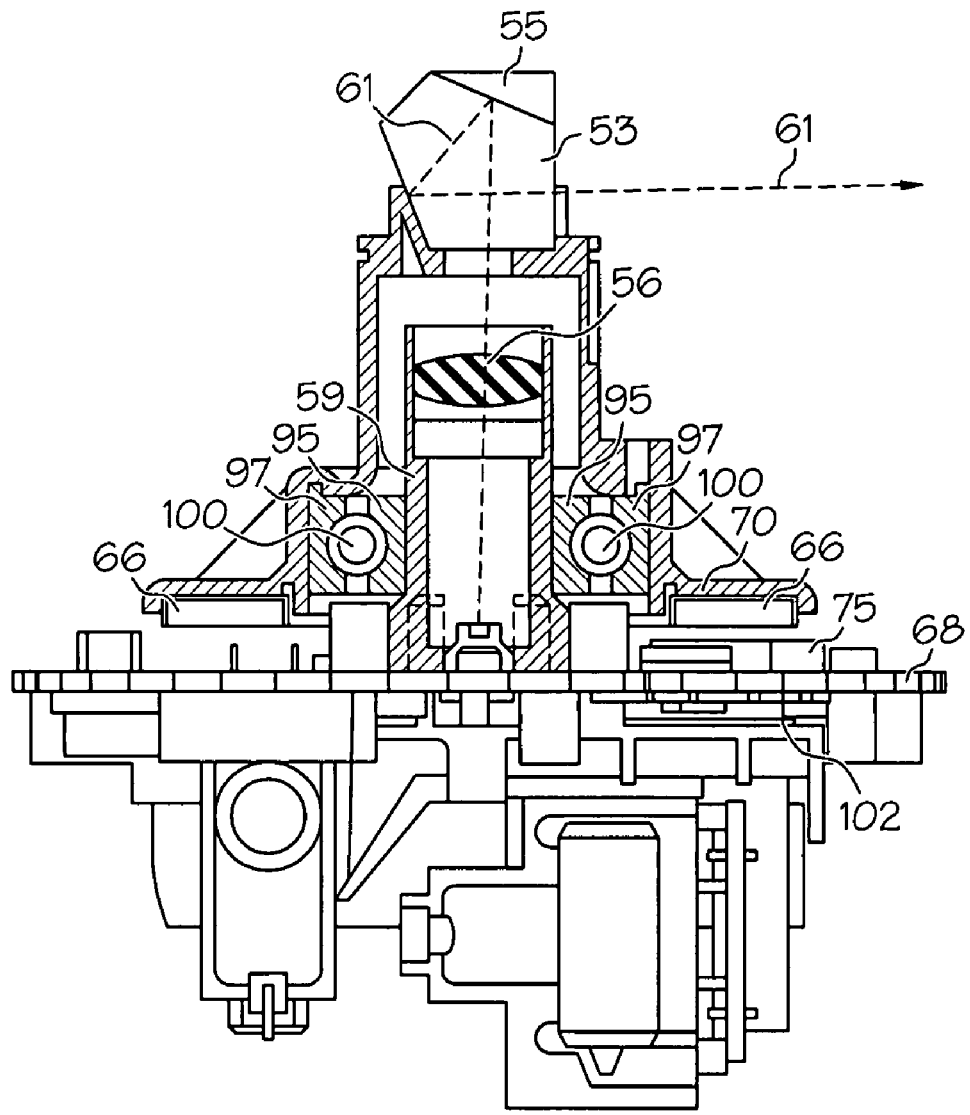
FIG. 3 is a sectional view, similar to FIG. 2, of a portion of the transmitter.
Figure 4:
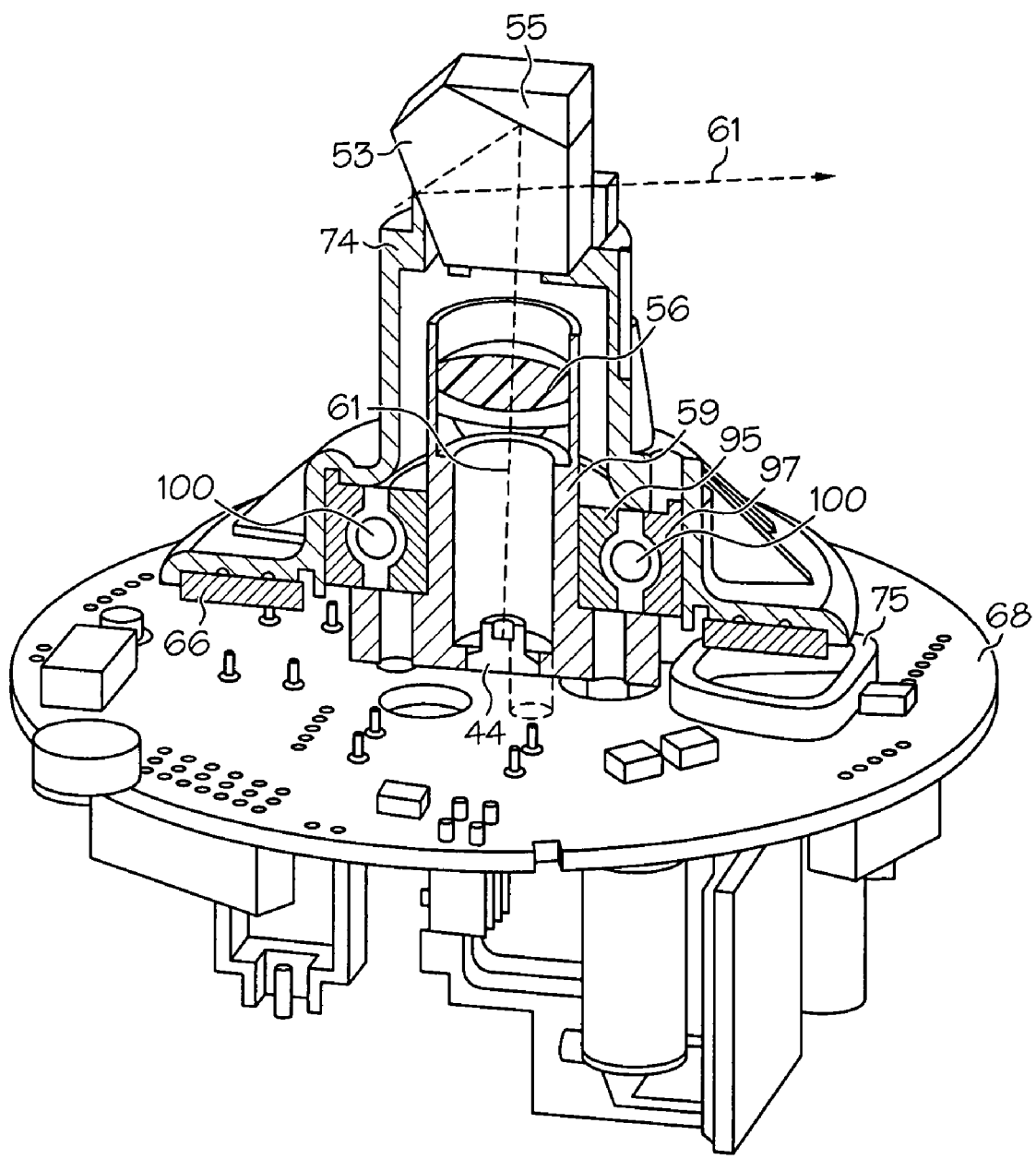
FIG. 4 is a perspective view of the portion of the transmitter shown in FIG. 3, but with some of the parts broken away.

As shown in FIG. 2, the laser transmitter has a non-rotatable portion 46 and a rotatable laser head 48. Rotatable laser head 48 includes the pentaprism element 53 which redirects a laser beam that is generated by a laser diode 52 and that passes upward through housing 59 and lens 56. The beam is directed radially outward through an opening 58 in cover 60 by the pentaprism 53, and is swept around the axis of rotation of the rotor 70. A portion of the beam may also pass upward through the pentaprism 53, the upper surface of which may be only partially reflective, through optical wedge 55, and pass out of the cover 60 through opening 62 in the same direction as the rotation axis of rotor 70. Optical wedge prevents the beam from being refracted as it passes out of the pentaprism assembly.

A flexible bellows seal 74 is provided in the opening 72, surrounding the laser generating unit and sealing the opening between the case 42 and the non-rotatable portion 46. The flexible bellows seal 74, extends from the edge of the opening 72 to the non-rotatable portion 46 and a plurality of annular accordion pleats which flex when the laser generating unit is tilted with respect to the case 42. The flexible bellows seal 74 may be made of an elastomer material, such as a silicone rubber.

The rotor rides on bearing 64 and is driven by the interaction of a ring of magnets 66 and a pair of coils 75 that are included on generally flat, circuit board stator 68. The bearing 64 has an inner race 95 mounted on the generally cylindrical housing 59 and an outer race 97 secured to the rotor 70. The bearing 64 includes a plurality of bearing balls 100 that are arranged in a single ring between inner race 95 and outer race 97. A magnetic shield plate 102, made of a magnetic material, such as steel, is mounted on the side of the circuit board stator 68 opposite the rotor 70. Plate 102 provides a magnetic attraction between the plurality of magnets 66 that are arranged in a ring on the rotor 70 and the magnetic shield plate 102. Plate 102 is preferably annular in shape, although other shapes may be used. The plate 102 applies a downward force to the rotor 70 that reduces or eliminates play in the bearing 64 that may result from manufacturing tolerances or from bearing wear.

Figure 5:
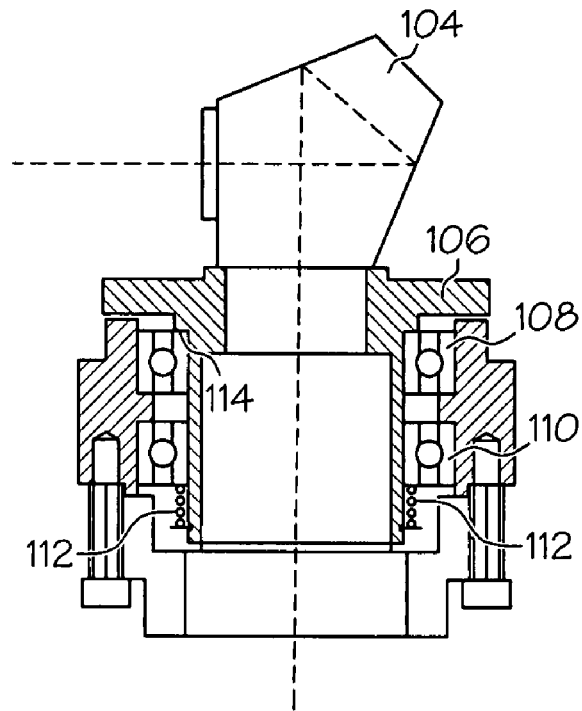
FIG. 5 is a diagrammatic representation of a prior art two bearing support.
Figure 6:
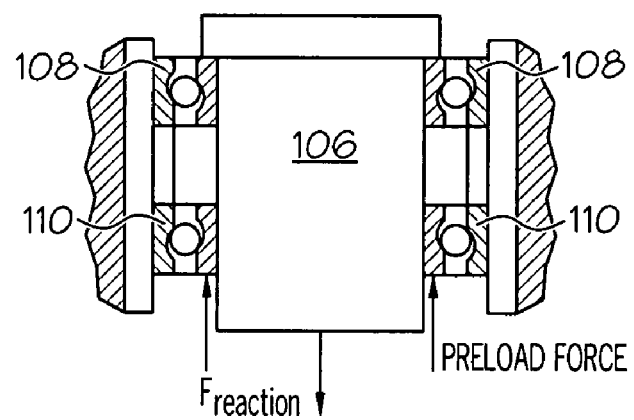
FIG. 6 is a further diagrammatic representation of a prior art two bearing support.

FIGS. 5 and 6 show a prior art bearing construction for a laser transmitter. A pentaprism assembly was typically mounted for rotation with a spindle 106, driven by a motor (not shown). Stability of the pentaprism 104 during rotation is very important to the performance of a transmitter. Angular changes, that is tilting, of the spindle 106 due to internal clearances within the bearings 108 and 110 could cause the pentaprism to tilt, resulting in laser beam position variations as the beam is swept around by the rotating pentaprism. The prior art approach to solving this problem is shown in FIGS. 5 and 6. A pair of bearings 108 and 110 are used in conjunction with a tensioning spring 112. The radial and axial bearing play were eliminated by applying a preload force to the inner race of the lower bearing 110. By this arrangement, a force is applied in opposite directions on the inner races of the bearings 108 and 110 by the preload spring 112 and the shoulder 114 on the spindle 106. FIG. 6 illustrates diagrammatically the effect of the preloading force on the bearing pair 108 and 110, showing the manner in which the internal clearances of the bearings are eliminated. With a bearing pair, the preload force can be applied only to the inner races, allowing the clearances to be removed from the bearing system. The only friction within the system is rolling friction from the balls. The drawback to this technique is the use of a second bearing, adding to the cost and weight of the transmitter.

Figure 7:
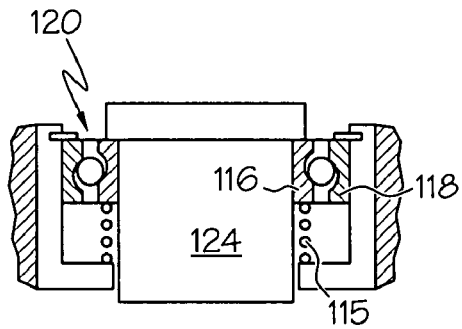
FIGS. 7 and 8 are diagrammatic drawings, useful in understanding the single bearing arrangement of the present invention.

This technique is not suitable for use in a single bearing construction, as shown diagrammatically in FIG. 7. In this case, the preload force from spring 115 must react from the inner race 116 directly to the outer race 118 of the bearing 120. An added resistance to rotation is present between the spring 115 and the inner race 116, making this configuration impractical.

Figure 8:
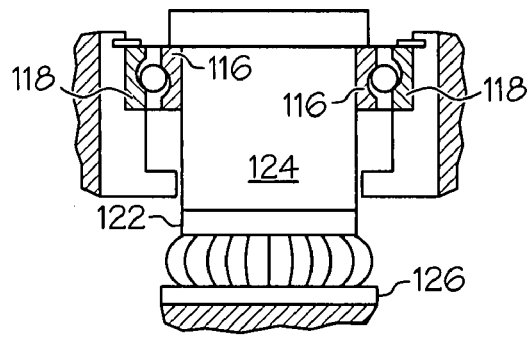

The present invention overcomes this problem, as diagrammatically illustrated in FIG. 8. The technique of applying a preload force to the inner race 116 relative to outer race 118 according to the present invention is to position a steel plate adjacent a magnet 122 on the bottom of the spindle 124 and a fixed steel plate 126 beneath the magnet 122. The magnetic attraction between magnet 122 and steel plate 126 produces a downward pull on the spindle 124. As a result, the internal clearances of the single bearing in FIG. 8 are removed without adding additional friction to the system.

Referring again to FIG. 3, it will be seen that this technique is particularly advantageous in this transmitter design in that the rotor 70 carries a plurality of magnets 66 in a ring that act in conjunction with coils 75 on the stator circuit board 68 to cause the rotor to rotate. The present invention contemplates making an additional use of magnets 66 by adding the magnetic shield 102 to produce the necessary amount of downward preloading force on the rotor 70 and the outer race 97 of the bearing 64. The amount of this preloading force is controlled by selecting the appropriate spacing between the magnets 66 and the plate 102.

Figure 9:
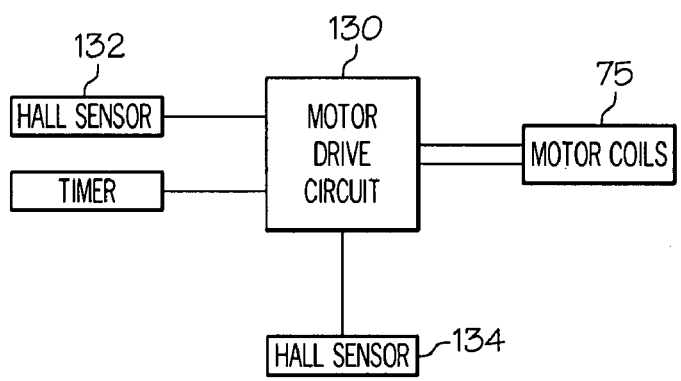
FIG. 9 is a block diagram illustrating the motor control of the present invention, and the manner in which dithering is accomplished.

The two coils 75 that provide the switched magnetic fields to cause the rotor 70 and the magnet ring of magnets 66 to rotate are energized by a motor drive circuit 130, shown in block diagram form in FIG. 9. A pair of Hall effect sensors 132 and 134 on the printed circuit board stator 68 provide pulse outputs each time a leading edge of a magnet 66 in the magnet ring rotates into proximity. Preferably there are 10 such magnets, resulting in 20 pulses per revolution of the rotor 70. As an alternative a ring magnet may be used having ten poles. The Hall effect sensors are arrange to give quadrature signals, thereby indicating the direction of rotation. The 20 pulses per revolution permit the azimuth to be parsed into 18 degree segments (360 degrees divided by 20 pulses per revolution). It is sometimes desirable to switch the transmitter into a dither mode of operation in which the beam is repeatedly swept back and forth across a fairly narrow segment of a revolution. For dither operation, it is desired to be able to sweep the beam repeatedly across segments as small as 3 degrees. The present invention provides this capability by dithering with a Hall effect sensor pulse providing one end of the sweep of the dithered beam, and a timer providing the signal to reverse the direction of rotation at the other end of the sweep of the dithered beam. Timer 136 is actuated each time the motor drive circuit 130 begins a sweep with the beginning of the sweep being determined by the Hall effect sensor. When the timer 136 reaches the desired time count, the motor drive circuit 130 reverses the direction of motor rotation, until the Hall effect sensor senses the return of the rotor to the original starting position. At this point the direction of rotation is again reversed, and the timer 136 is restarted. This technique provides accurate dither width, while eliminating the need for costly angle sensors. It will be appreciated that other dither control techniques using timer 136 and Hall effect sensor outputs may be used. For example, the Hall effect pulse may be used to define the center of the sweep, with the time output defining each end of the sweep.

Other aspects, objects, and advantages of the present invention can be obtained from a study of the drawings, the disclosure, and the appended claims.

What is claimed is:

1. A laser transmitter, comprising:
a generally flat, circuit board stator, including a plurality of motor coils,
a laser source, mounted on said stator, for providing a beam of laser light directed outward from said circuit board stator,
a rotor including a plurality of magnets mounted in a ring around a central opening,
a pentaprism assembly including an optics holder mounted on said rotor for rotation therewith, said pentaprism assembly receiving said beam of laser light through said central opening and redirecting at least a portion of said laser light outward in a direction normal to said rotation axis,
a bearing, supporting said rotor for rotation about a rotation axis that extends through said central opening and that is aligned with said beam of laser light,
said bearing comprising a single ball bearing having a plurality of bearing balls between an outer race secured to said rotor and an inner race, and
a magnetic shield plate on the side of said circuit board stator opposite said rotor for providing for magnetic attraction between said plurality of magnets and said magnetic shield plate, whereby play in said bearing is substantially eliminated.

2. The laser transmitter of claim 1, in which said plurality of magnets comprises a ring magnet having a plurality of poles arranged in a circle.

3. The laser transmitter of claim 1 in which said laser source comprises a light emitting diode and a generally cylindrical housing mounted on said circuit board stator, said housing surrounding said light emitting diode and permitting the beam from the diode to pass there through, said collimating lens being mounted in said housing such that a collimated beam of laser light is directed to said pentaprism assembly.

4. The laser transmitter of claim 3 in which said bearing has an inner race mounted on said generally cylindrical housing and an outer race secured to said rotor.

5. A laser transmitter, comprising:
a stator,
a laser source, mounted on said stator, for providing a beam of laser light directed outward from said stator,
a rotor including magnets in a ring around a central opening,
a bearing, supporting said rotor for rotation about a rotation axis that extends through said central opening and that is aligned with said beam of laser light,
a pentaprism assembly including an optics holder mounted on said rotor for rotation therewith, said pentaprism assembly receiving said beam of laser light through said central opening and redirecting at least a portion of said laser light outward in a direction normal to said rotation axis, and
a magnetic shield plate on the side of said stator opposite said rotor for applying a force to said rotor in the direction of said axis of rotation such that said rotor applies an axial force to said bearing, whereby magnetic attraction between said plurality of magnets and said magnetic shield plate substantially eliminates any play in said bearing.

6. The laser transmitter of claim 5, in which said bearing comprises an inner race supported on said laser source, and an outer race engaged by said rotor, and a plurality of balls between said inner race and said outer race.

7. The laser transmitter of claim 5, in which said laser source includes a cylindrical housing, and in which said inner race is supported on said cylindrical housing of said laser source.

8. The laser transmitter of claim 5 in which said magnetic shield plate on the side of said stator opposite said rotor is annular in shape.

9. The laser transmitter of claim 5, in which said bearing comprises an outer race supported by said inner race and engaging said rotor.

10. A laser transmitter, comprising:
a stator,
a laser source for providing a beam of laser light,
a rotor including magnets,
a bearing, supporting said rotor for rotation about a rotation axis, said bearing comprising a single inner race and a single outer race with a plurality of bearing balls therebetween,
a pentaprism assembly including an optics holder mounted on said rotor for rotation therewith, said pentaprism assembly receiving said beam of laser light and redirecting at least a portion of said laser light outward in a direction normal to said rotation axis, and
a plate of magnetic material positioned to provide an axial biasing force to said bearing whereby magnetic attraction between said plurality of magnets and said plate substantially eliminates the play in said bearing.

11. The laser transmitter of claim 10, in which said magnets are arranged in a ring, and in which said plate of magnetic material is annular in shape.

12. A laser transmitter, comprising:
a stator including a plurality of motor coils and a pair of Hall effect sensors,
a rotor including magnets mounted in a ring,
a bearing, supporting said rotor for rotation about a rotation axis,
a laser source for providing a beam of laser light,
a pentaprism assembly including an optics holder mounted on said rotor for rotation therewith, said pentaprism assembly receiving said beam of laser and redirecting at least a portion of said beam outward in a direction normal to said rotation axis, and
a motor drive circuit, responsive to said Hall effect sensor and to a timer, for repeatedly driving the rotor in a first direction and then driving the rotor in a second direction, with the reversal of the direction of rotation being based at least in part on the passage of time after the Hall effect sensor provides an indication of the rotor being in a specific location.

13. The laser transmitter of claim 12 in which said motor drive circuit drives the rotor in a first direction upon receipt of an output from a Hall effect sensor, and reverses the direction of rotation after the passage of a predetermined amount of time.

14. The laser transmitter of claim 12 in which said motor drive circuit drives the rotor in a first direction after a passage of a predetermined time following the receipt of an output from a Hall effect sensor, and drives the rotor in a second direction after a passage of time following the receipt of the next output from the Hall effect sensor.

* * * * *